Dec. 30, 1958   E. G. BENTLEY   2,866,910

PAWL TYPE INCREMENTAL MOTOR

Filed Nov. 9, 1954

INVENTOR:
Ephraim G. Bentley
By Hubert E. Metcalf
His Patent Attorney

United States Patent Office 2,866,910
Patented Dec. 30, 1958

2,866,910

PAWL TYPE INCREMENTAL MOTOR

Ephraim G. Bentley, El Segundo, Calif., assignor to Northrop Aircraft, Inc., Hawthorne, Calif., a corporation of California Application November 9, 1954, Serial No. 467,722

8 Claims. (Cl. 310—20)

The present invention relates to devices operated by electrical pulses, and more particularly described as a stepper motor.

In some stepper motors it is necessary to provide structure which may be rotated very accurately a defined distance for each pulse and preferably is adapted to be rotated in one direction or the other or alternately in one direction and then the other depending on the manner in which the electrical pulses are transmitted to the device.

Stepper motors are used to control accurately functioning mechanisms such as computing devices, electrical relay systems that may be found in communication equipment, servo systems and similar applicable structures.

Devices of the kind to which this invention relates, should also be so constructed that they may be readily incorporated in place of other previously used devices in a wide variety of equipment and should be readily adapted to the special needs of whatever type of equipment the device is to be used. In addition the stepper motor should be capable of operating on the electrical power provided therefor.

Therefore, the principal object of this invention is to provide an electrical pulse actuated stepper motor which can be operated very accurately for an extended period of time without danger of missing any pulses.

Another object of this invention is to provide an electrical pulse actuated stepper motor capable of use in a variety of equipment, which may be readily actuated in one or the other direction or alternately in one direction and then the other or in any combination thereof.

Figure 1:
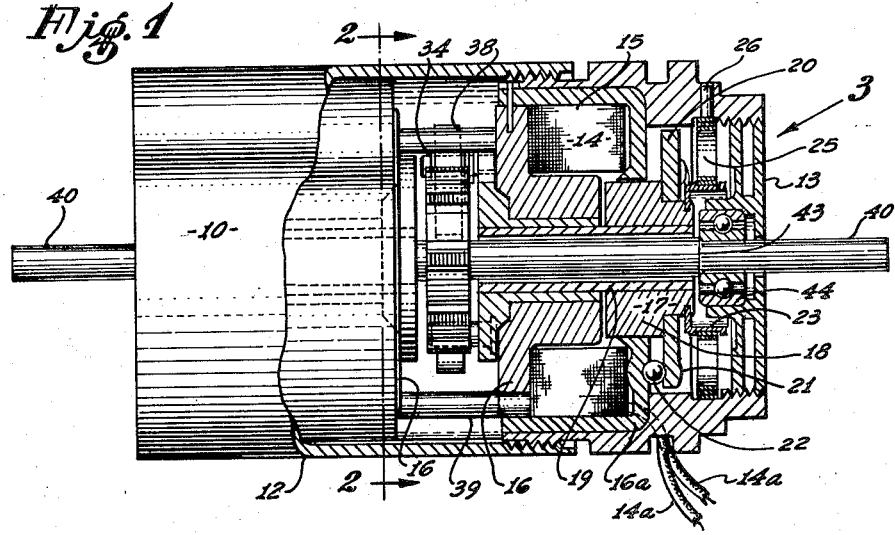
Figure 1 is a fragmentary, cross-sectional view, parts being broken away and shown by dotted lines for purposes of clarity.

Referring to the drawings for a detailed description of the preferred embodiment of the present invention, 10 broadly designates a stepper motor, the operational parts of which are enclosed within a cylindrical housing 12 which has end caps 13 threaded thereinto. That portion of the stepper motor to the left of the center line as viewed in Figure 1 is substantially identical to that to the right. Therefore, only one side will be described except where it is necessary to fully and completely describe essential structure in order that a completely operative device may be set forth and it is to be understood that what is applicable to one side is equally applicable to the other.

The operational structure of the stepper motor comprises a solenoid assembly broadly designated by 14, having an electrical lead 14a attached to an electromagnetic solenoid coil 15; the latter being partially protected from moving structure by housing 16. The solenoid assembly 14 is for the most part of conventional construction. Two electrical leads 14a are shown on the right hand side of Figure 1. It is to be understood that one is for the coil on the left.

Associated with solenoid assembly 14 is an armature assembly broadly designated by 17 which comprises a solenoid actuated armature 18, pressed or otherwise secured to a hollow, elongated shaft 19, and to which is secured an armature plate 20, the latter having a plurality of inclined arcuate groves 21 formed therein each one of which receives a ball 22. The balls 22 are held in the grooves by virtue of the fact that they are in continuous contacting relationship with structure 16a. Secured to the armature 18 between plate 20 and end cap 13 is a drum 23 having a plurality of notches 24 therein and around which a flat spring 25 is coiled. One end 26 of the spring is affixed to housing 12 and the other end 27 fits within one of the notches 24.

Accordingly, when the coil 15 is energized, a magnetic force of sufficient magnitude is generated to draw armature 18 in toward the magnetic field and the coil 15. As the armature is drawn in toward the coil 15, the armature assembly 17, including shaft 19, and armature 18 is caused to rotate due to the balls 22 operating in the grooves 21 in the conventional inclined plane principle. Upon deenergization of the coil 15 the armature assembly 17, shaft 19, and armature 18 are returned to their original position by the combined action of the spring 25, groove 21 and balls 22.

Figure 2:
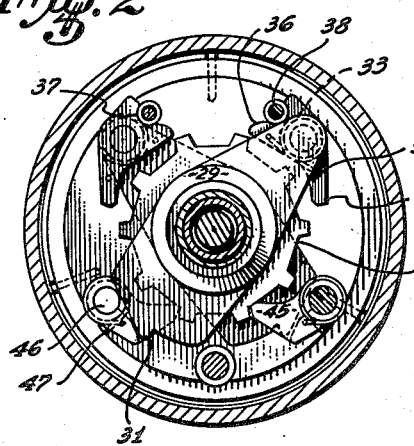
Figure 2 is a transverse, cross-sectional view taken on line 2—2 in Figure 1 looking in the direction indicated.
Figure 3:
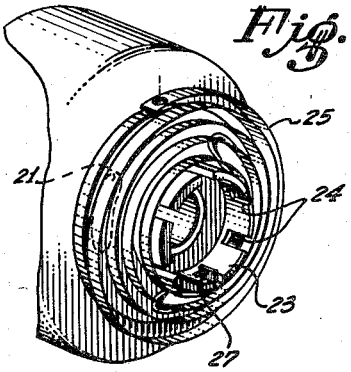
Figure 3 is a fragmentary, perspective view illustrating the driving assembly return spring, looking in the direction of the arrow found in Figure 1 and identified by 3.
Figure 4:
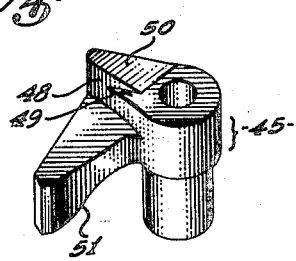
Figure 4 is an enlarged, perspective view of a sprocket and shaft locking pawl.

The shaft 19 extends beyond the housing 16, is rotated within and supported by a bearing 28, and has secured on the end thereof in opposed relationship to the drum 23, a driving assembly broadly designated by 29 found in Figure 2. There is one substantially identical drive assembly interconnected to each armature assembly on each side of the center line. Therefore only one will be described, but it is to be understood that each drive assembly functions like the other but in opposite directions of rotation.

The drive assembly has a cam 31 on one end thereof which actuates a lock pawl, to be more fully described. In opposed relationship to the cam 31 is a drive pawl 32 which pivots about a pin shaft 33 secured to said drive assembly 29 and rotates with the latter. Secured to pin shaft 33 is a stop washer 34 against which drive pawl 32 is urged by a compression spring 35 coiled about pin shaft 33. Stop washer 34 retains drive pawl 32 on pin shaft 33. The drive pawl 32 has a cam 36 thereon and a groove 37 therein which engages a pin 38 secured to housings 16 and spanning the distance therebetween. Pin 38, in addition to functioning as a drive pawl lock, functions also as a spacer in cooperation with spacer 39 to maintain the solenoid assemblies 14, armature assemblies 17 and drive assemblies 29 an equi-distant apart.

Rotatable within both shafts 19, extending outwardly from each end of the housing 12, is a single driven shaft 40, which has secured thereto, intermediate its ends, a single multi-toothed sprocket wheel 41. The sprocket wheel 41 and shaft 40 are caused to rotate by drive pawl 32 engaging one of the teeth of the sprocket when one or the other of the driving assemblies are caused to rotate.

The shaft 40 and sprocket 41 are restrained against axial movement by virtue of shaft 40 having a shoulder 43 thereon which engages the inner race of a ball bearing 44.

Shaft 40 and sprocket 41 are locked against rotation by a spring actuated lock pawl broadly designated 45, pivotally mounted on a pawl pin 46. One pawl pin 46 is secured to one housing 16 and the other pawl pin is secured to the opposed housing as may be determined by referring to Figure 2. The pawl 45 is continuously urged off the pawl pin 46 and into engagement with the sprocket 41 by compression spring 47. However, the pawl 45 is maintained on the pin 46 by virtue of the cam end 31 of the driving assembly 29 being in continuous engagement therewith in a manner as viewed in Figure 2.

The pawl 45 includes a plurality of inclined faces 48, 49, and 50 thereon, which are engaged by the cam 31 on the driving assembly 29, and a sprocket engaging arm 51.

A complete cycle of operation of the stepper motor 10 will now be described. The stepper motor 10, as viewed in the various figures, is in a de-energized condition. When an electrical pulse is imposed on electromagnetic coil 15 through electrical lead 14a, the armature 18, and related structure, is drawn in toward coil 15 and toward the housing 16. Rotation is applied to the armature assembly 17 by the balls 22 rotating in inclined grooves 21. This rotation and axial movement is transmitted to the driving assembly 29 which results in the cam 31 engaging the face 48 on pawl 45 and rotating the arm 51 out of engagement with toothed sprocket wheel 41. As pawl 45 is pivotally rotated and axial movement is applied thereto by virtue of the axial movement and rotation imposed on driving assembly 29, the cam 31 rides on face 49. When pawl arm 51 is pivoted out of engagement with toothed sprocket wheel 41, the driving assembly 29 has traveled a sufficient distance to release drive pawl 32 from its locked position against pin shaft 33. Spring 35 urges pawl 32 into engagement with sprocket wheel 41 and the continuous rotation of the driving assembly 29 is transmitted thereto. As the cam 31 passes over the pawl 45 and out of engagement with faces 48 and 49, the pawl 45 is released and spring 47 urges the latter into engagement with sprocket wheel 41. It is obvious that only one coil 15 will be energized at a time and consequently only one driving assembly. As a result one pawl 45 will always be engaged with sprocket wheel 41. However, the pawl 45 not pivoted will drag over the sprocket wheel 41 as it is rotated.

When the driving assembly 29 has reached the terminus of its path of travel by virtue of balls 22 engaging one end of the groove 21 and the coil 15 being deenergized, the spring 25 will cause the armature assembly 17 and driving assembly 29 to return to their original positions.

In returning to its original position, the cam 31 on the driving assembly 29 strikes inclined face 50 on the pawl 45 and urges the latter to assume an axial movement against spring 47. This axial movement does not disengage arm 51 from the sprocket wheel 41 or cause it to assume a jamming condition but permits the driving assembly 29 to return to its point of origin. As the driving assembly 29 is returned to its original position, driving pawl 32 is caused to drag back over the sprocket wheel 41 until the cam 36 thereon engages pin 38 which results in pivoting pawl 32 out of engagement with sprocket wheel 41 and into groove 37 until another electrical pulse is imposed on coil 15.

It may be seen by referring to Figures 1 and 2, that one complete assembly, i. e., the solenoid assembly 14, armature assembly 17, driving assembly 29 and driven assembly 40 and 41 is adapted for clockwise, and one for counterclockwise rotation and that the operational structure of the stepping motor 10 may be rotated alternately in either a clockwise or counter-clockwise manner.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A pulse operated electrical instrument comprising a solenoid coil assembly; a rotatable armature assembly actuated by said coil assembly each time an electrical pulse is transmitted thereto; a driving assembly interconnected to said armature assembly and rotatable therewith; a spring loaded and rotatable drive pawl on said driving assembly; a rotatable driven assembly engaged and actuated by said drive pawl on said driving assembly; a lock pin, engaged by said pawl, on said solenoid coil assembly that locks said drive pawl out of engagement with said driven assembly when said solenoid coil assembly is de-energized; spring loaded, rotatable pawls on said solenoid coil assembly that stops the rotation and locks the driven assembly against rotation when the solenoid coil assembly is de-energized; and elements on said driving assembly for returning the latter to its original position.

2. A pulse operated electrical instrument comprising a solenoid coil assembly; an armature assembly rotatably and axially actuated by said coil assembly each time an electrical pulse is transmitted thereto; a driving assembly secured to said armature assembly and rotatable therewith; a drive pawl on said driving assembly; a rotatable driven assembly engaged and actuated by said drive pawl on said driving assembly; means on said driven assembly for restraining the axial movement thereof imposed by said driving assembly; a lock pin, engaged by said drive pawl, on said solenoid coil assembly that locks said drive pawl out of engagement with said driven assembly when said solenoid coil assembly is de-energized; a pair of spring loaded, rotatable pawls on said solenoid coil assembly that stops the rotation and locks the driven assembly against rotation when the solenoid coil assembly is de-energized; and elements on said driving assembly for returning the latter to its original position.

3. A pulse operated electrical instrument comprising a solenoid coil assembly; a rotatable armature assembly actuated by said coil assembly each time an electrical pulse is transmitted thereto, a driving assembly interconnected to said armature and rotatable therewith; a drive pawl on said driving assembly; a rotatable driven assembly engaged and actuated by said drive pawl on said driving assembly; said driven assembly being a shaft rotating sprocket; a lick pin, engaged by said drive pawl, on said solenoid coil assembly that locks said drive pawl out of engagement with said driven assembly; when said solenoid coil assembly is de-energized; a pair of spring loaded, rotatable pawls on said solenoid coil assembly that stops the rotation and locks the driven assembly against rotation when the solenoid coil assembly is de-energized; and elements on said driving assembly for returning the latter to its original position.

4. A pulse operated electrical instrument comprising a solenoid coil assembly; a rotatable armature assembly actuated by said coil assembly each time an electrical pulse is transmitted thereto; a driving assembly interconnected to said armature and rotatable therewith; a drive pawl on said driving assembly; a rotatable driven assembly engaged and actuated by said drive pawl on said driving assembly; said driven assembly being a shaft rotating sprocket; means on said solenoid coil assembly for locking said drive pawl out of engagement with said driven assembly; sprocket locking pawls on said solenoid coil assembly that stops the rotation and locks the driven assembly against rotation when the solenoid coil assembly is de-energized; and elements on said driving assembly for returning the latter to its original position.

5. A pulse operated electrical instrument comprising a solenoid coil assembly; a rotatable armature assembly actuated by said coil assembly each time an electrical pulse is transmitted thereto; a driving assembly interconnected to said armature assembly and rotatable therewith; a drive pawl on said driving assembly; a rotatable driven assembly engaged and actuated by said drive pawl on said driving assembly; said driven assembly being a shaft rotating sprocket; a lock pin, engaged by said drive pawl, on said solenoil coil assembly that locks said drive pawl out of engagement with said driven assembly when the solenoid coil assembly is de-energized; sprocket locking pawls on said solenoid coil assembly that stops the rotation and locks the driven assembly against rotation when the latter is de-energized; means on said driving assembly for disengaging said sprocket locking pawl from the locking condition; and elements on said driving assembly for returning the latter to its original position.

6. A pawl comprising: a hollow hub and bushing through which a shaft extends; a first triangular projection integral with and extending from said hub; a second triangular shaped projection integral with said hub and first triangular projection; said first and second projections each having a face that is inclined in opposed directions; and a third triangular projection integral with said hub, first and second projections; said third triangular projection being perpendicular to said first and second projections.

7. A pawl comprising: a hollow hub and bushing through which a shaft extends; a first projection integral with and extending from said hub and having an inclined face thereon; a second projection integral with said hub and first projection; said second projection having a face thereon inclined in a direction in opposed relationship to the inclination of the face on the first projection; and a third projection integral with said hub, first and second projections.

8. A pulse operated electrical instrument comprising mechanism that converts an electrical pulse into a magnetic force; a driving assembly rotatably actuated by said mechanism; a driven assembly; at least one pawl on said driving assembly that engages said driven assembly to rotate the same; a pair of spring loaded, rotatable pawls, on said mechanism, one of which engages said driven assembly to limit the rotation in one direction and the other of which engages said driven assembly to lock against rotation in the opposed direction; a cam on said driving assembly that engages the one pawl to disengage the same from said driven assembly when said pawl on said driving assembly engages said driven assembly; and means on said driving assembly that returns the latter to its original position.

References Cited in the file of this patent

UNITED STATES PATENTS

| | | |
|---|---|---|
| 368,406 | Marvin | Aug. 16, 1887 |
| 392,238 | Tetrault | Nov. 6, 1888 |
| 651,860 | Joyce | June 19, 1900 |
| 1,022,742 | Kellum | Apr. 9, 1912 |
| 1,445,271 | Gent | Feb. 13, 1923 |
| 2,475,232 | Giannini | July 5, 1949 |